US012635057B2

(12) United States Patent
Kubitza et al.

(10) Patent No.: US 12,635,057 B2
(45) Date of Patent: May 19, 2026

(54) METHOD FOR OPERATING A CIRCUIT ARRANGEMENT HAVING AN OPEN-LOOP AND/OR CLOSED-LOOP CONTROLLER FOR AN ILLUMINATION FIELD

(71) Applicant: HELLA GmbH & Co. KGaA, Lippstadt (DE)

(72) Inventors: Boris Kubitza, Moehnesee-Koerbecke (DE); Martin Pluempe, Paderborn (DE); Carsten Wilks, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 99 days.

(21) Appl. No.: 18/665,014

(22) Filed: May 15, 2024

(65) Prior Publication Data

US 2024/0298394 A1 Sep. 5, 2024

Related U.S. Application Data

(63) Continuation of application No. PCT/EP2022/080240, filed on Oct. 28, 2022.

(30) Foreign Application Priority Data

Nov. 15, 2021 (DE) ..................... 10 2021 129 680.3

(51) Int. Cl.
*H05B 47/10* (2020.01)
*H05B 45/10* (2020.01)
(Continued)

(52) U.S. Cl.
CPC ............. *H05B 47/11* (2020.01); *H05B 45/12* (2020.01); *H05B 47/17* (2020.01)

(58) Field of Classification Search
CPC ........ H05B 45/10; H05B 45/12; H05B 47/10; H05B 47/11; H05B 47/17
See application file for complete search history.

(56) References Cited

U.S. PATENT DOCUMENTS

| | | | |
|---|---|---|---|
| 11,046,248 | B2 | 6/2021 | Plank et al. |
| 11,713,861 | B2 | 8/2023 | Huester et al. |

(Continued)

FOREIGN PATENT DOCUMENTS

| | | | | |
|---|---|---|---|---|
| DE | 102008060042 A1 | | 9/2009 | |
| DE | 102016122499 A1 | * | 5/2018 | .......... B60Q 11/005 |

(Continued)

OTHER PUBLICATIONS

International Search Report dated Jan. 5, 2023 in corresponding application PCT/EP2022/080240.

*Primary Examiner* — Jimmy T Vu
(74) *Attorney, Agent, or Firm* — Muncy, Geissler, Olds & Lowe, P.C.

(57) ABSTRACT

A method for operating a circuit arrangement is provided. An illumination field has at least one first module and one second module that each comprise at least one light source and a controllable switching element. An open-loop and/or closed-loop controller for the illumination field is provided, wherein the controllable switching elements are controlled by the open-loop and/or closed-loop controller such that switch-on times and/or switch-off times are defined for each light source by the open-loop and/or closed-loop controller and such that the open-loop and/or closed-loop controller controls one and/or more controllable switching elements of the modules to close during the switch-on times and to open during the switch-off times. The switch-on times and/or switch-off times are determined based on a desired luminous intensity distribution of the individual modules or a desired overall luminous intensity distribution.

14 Claims, 2 Drawing Sheets

(51) Int. Cl.

| | |
|---|---|
| ***H05B 45/12*** | (2020.01) |
| ***H05B 47/11*** | (2020.01) |
| ***H05B 47/17*** | (2020.01) |

(56) References Cited

U.S. PATENT DOCUMENTS

| | | | | |
|---|---|---|---|---|
| 2014/0159593 | A1* | 6/2014 | Chu | H05B 45/48 315/191 |
| 2015/0351179 | A1* | 12/2015 | Briggs | H05B 47/25 315/294 |
| 2017/0008446 | A1 | 1/2017 | Albou et al. | |

FOREIGN PATENT DOCUMENTS

| | | | | |
|---|---|---|---|---|
| DE | 102017129254 | A1 * | 7/2018 | F21S 41/153 |
| DE | 102019118381 | A1 | 1/2021 | |
| EP | 3530520 | A1 | 8/2019 | |
| EP | 3543593 | A1 | 9/2019 | |

* cited by examiner

METHOD FOR OPERATING A CIRCUIT ARRANGEMENT HAVING AN OPEN-LOOP AND/OR CLOSED-LOOP CONTROLLER FOR AN ILLUMINATION FIELD

This nonprovisional application is a continuation of International Application No. PCT/EP2022/080240, which was filed on Oct. 28, 2022, and which claims priority to German Patent Application No. 10 2021 129 680.3, which was filed in Germany on Nov. 15, 2021, and which are both herein incorporated by reference.

BACKGROUND OF THE INVENTION

Field of the Invention

The present invention relates to a method for operating a circuit arrangement having an illumination field, wherein the illumination field comprises at least one first module and one second module, which each comprise at least one light source, having an open-loop and/or closed-loop controller for the illumination field, wherein each light source is controlled by the open-loop and/or closed-loop controller, to be precise, in such a way that a brightness of each light source is set based on a desired luminous intensity distribution of the individual modules or a desired overall luminous intensity distribution.

Description of the Background Art

Illumination fields with more than one module are known in conventional modern lighting equipment, for example, in headlights for vehicles. The control takes place via an open-loop and/or closed-loop controller, which is designed to set the brightness of the respective light sources in the modules.

This can occur, for example, in that the open-loop and/or closed-loop controller controls a controllable switching element, connected in series to a light source, to close or open. In the simplest case, the controllable switching element is a switch. A current flow through the light source is possible by closing the switch; this current flow is interrupted by opening. The controllable switching elements of each module are controlled to close so that the light source(s) in each module contribute(s) a portion to the luminous intensity distribution of the module. Hereby, on the one hand, it is important that the luminous intensity distribution has a desired homogeneity and, on the other, that it provides the desired intensity.

An overall luminous intensity distribution then results for the observer from the superimposition of the luminous intensity distributions of the individual modules. The control of today's modules in illumination fields usually occurs on the basis of two different criteria.

There is either the possibility of determining the brightness of the light sources based on a desired luminous intensity distribution of the individual modules or based on a desired overall luminous intensity distribution.

If an optimal luminous intensity distribution is determined for the individual modules, this is particularly important for the viewer's perception. The luminous intensity distribution of each module can be perceived by an observer and should therefore be homogeneous for acceptance, for example, by an end customer of the vehicle, when an observer is in the vicinity of the vehicle. With this approach, however, the overall luminous intensity distribution emitted, which results from the superimposition of the individual luminous intensity distributions of the modules, is not always optimal.

Another approach therefore is to define an optimal overall luminous intensity distribution, which is particularly desirable when the vehicle is moving and the impression of the overall luminous intensity distribution outweighs the impression of the luminous intensity distributions of each individual module. This can be achieved by adjusting the control of at least one module so that the individual modules emit the optimal overall luminous intensity distribution when superimposed.

In today's circuit arrangements for illumination fields, one of the two options is selected and the controllable switching elements are controlled by the open-loop and/or closed-loop controller so that either the desired luminous intensity distribution of an individual module or the desired overall luminous intensity distribution is achieved.

The desired luminous intensity distribution or the overall luminous intensity distribution is generated by this approach only for a specific state, for example, a parking situation or a driving situation of the vehicle.

For example, the document EP 3 543 593 A1 shows an illumination device with two illuminants and at least one second projection optical unit assigned to the second illuminant, wherein the second projection optical unit is set up to image the light beams emitted by the second illuminant as a second partial light distribution in front of the illumination device, wherein this second partial light distribution contributes to the overall light distribution of the illumination device. In this document, the overall light distribution of the illumination device can be widened with the additional illuminant, which can generate a second partial light distribution.

SUMMARY OF THE INVENTION

It is therefore an object of the present invention to create a transition between the desired luminous intensity distribution of an individual module and a desired overall luminous intensity distribution of an illumination field in a vehicle in different states of the vehicle.

The problem is solved in an example, by a method for operating a circuit arrangement having an illumination field, wherein the illumination field comprises at least one first module and one second module, which each comprise at least one light source, having an open-loop and/or closed-loop controller for the illumination field, wherein each light source is controlled by the open-loop and/or closed-loop controller, to be precise, in such a way that a brightness of each light source is set based on a desired luminous intensity distribution of the individual modules or a desired overall luminous intensity distribution, wherein a transition between the desired luminous intensity distribution of the individual modules and the desired overall luminous intensity distribution is implemented continuously.

A situation-dependent selection of the optimal luminous intensity distribution is possible by means of the method. At the same time, a transition between the two options for determining the brightness is not abrupt; i.e., it is not switched from one method to the other at a predetermined moment. In the context of the present invention, continuous can mean in particular that there is a range in which the brightness of the light sources is determined based on a desired luminous intensity distribution of the individual modules and a desired overall luminous intensity distribution.

It may advantageously be provided that each module comprises at least one controllable switching element, wherein the controllable switching elements are controlled by the open-loop and/or closed-loop controller, to be precise, in such a way that the brightness of each light source is set by defining switch-on times and/or switch-off times for each light source by the open-loop and/or closed-loop controller, and the open-loop and/or closed-loop controller controls one and/or more controllable switching elements of the modules during the switch-on times for closing and during the switch-off times for opening.

In this approach, the setting of the brightness of the individual light sources occurs via pulse width modulation; i.e., each light source is switched on in a specific time range for a period of time that results in the required brightness.

In order to achieve the desired luminous intensity distribution, for example, the switch-on times and/or switch-off times can be determined first based on a desired luminous intensity distribution of the individual modules. In order to determine the switch-on times and/or switch-off times based on a desired overall luminous intensity distribution, a weighted determination takes place for a predefined time period. This occurs initially with high proportions, which are obtained based on the desired luminous intensity distribution of the individual modules. This proportion then decreases in favor of a determination that is carried out based on a desired overall luminous intensity distribution, until a determination of the switch-on times and/or switch-off times is made exclusively based on a desired overall luminous intensity distribution.

In this regard, it can be provided that the overall luminous intensity distribution is created by superimposing the luminous intensity distributions of the individual modules.

Furthermore, it is possible that the first module is an LED module with a low resolution and the second module is an LED module with a high resolution. LED modules are used preferentially in today's vehicles as they offer great flexibility in terms of control. At the same time, they have a long service life. A matrix LED module with a number of LEDs less than 100, for example, can be a module with a low resolution. This module is mostly used because of its high intensity and a simultaneously low cost. The second module can be an HD module with a number of LEDs of more than 10,000 LEDs. As each individual LED in an HD module contributes to the luminous intensity distribution of the module, this offers especially many control options.

It may be provided that the transition between the desired luminous intensity distribution of the individual modules and the desired overall luminous intensity distribution takes place based on at least one measured parameter, wherein the measured parameter can be, for example, the speed of the vehicle and/or the distance of the vehicle to other objects.

In this case, it may be provided that a lower and an upper threshold is defined for the at least one measured parameter and stored in the open-loop and/or closed-loop controller. These thresholds can be different for different situations. For example, it is conceivable that the thresholds are defined differently when measuring speed in good weather than when it is raining. In such a case, additional sensors may be required to support the measured parameter.

It is possible that in the case of a measured value for at least one measured parameter which is below the lower threshold, the brightness for each light source is determined based on a desired luminous intensity distribution of the individual modules. If a vehicle, e.g., is parked in front of a garage wall or drives slowly past other vehicles or obstacles, it is desirable for each module to have an optimal luminous intensity distribution. Shaded areas that are not controlled could be interpreted as a malfunction.

Furthermore, it may be provided that in the case of a measured value for the at least one measured parameter which is above the upper threshold, the brightness for each light source can be determined based on a desired overall luminous intensity distribution. This is the case, for example, when a vehicle is driving rather fast and the road in front of the vehicle is free of obstacles such as oncoming traffic. In this case, the desired overall luminous intensity distribution offers a better illumination of the road and a higher light intensity.

In particular, it is possible that in the case of a measured value for the at least one measured parameter which lies between the lower threshold and the upper threshold, the brightness for each light source can be determined weighted based on the distance of the measured value to the respective threshold.

In this connection, it may be provided that the luminous intensity distributions are determined using the following formula, wherein the brightnesses for each light source are determined from the calculated luminous intensity distributions:

$$OverallLID_l = LID_{Module1,opt} + LID_{Module2,opt}$$

$$OverallLID_u = OverallLID_{opt} = LID_{Module1} + LID_{Module2}$$

$$OverallLID_m = (1 - v) * OverallLID_l + v * OverallLID_u$$

Where:

$OverallLID_l$ is the luminous intensity distribution for parameter values below the lower threshold, $OverallLID_u$ is the luminous intensity distribution for parameter values above the upper threshold, $OverallLID_m$ is the luminous intensity distribution for parameter values above the lower threshold and below the upper threshold, $LID_{Module1,opt}$ is the desired luminous intensity distribution of the first module, $LID_{Module2,opt}$ is the desired luminous intensity distribution of the second module, $OverallLID_{opt}$ is the desired overall luminous intensity distribution, $LID_{Module1}$ is the luminous intensity distribution of the first module calculated to achieve the desired overall luminous intensity distribution, $LID_{Module2}$ is the luminous intensity distribution of the second module calculated to achieve the desired overall luminous intensity distribution, and where v is the distance between the lower threshold and the measured value as a percentage of the distance between the two thresholds.

In this case, the transition between the desired luminous intensity distribution of the individual modules and the desired overall luminous intensity distribution is continuous, so that the change is not noticeable to the observer.

The invention relates to an open-loop and/or closed-loop controller for an illumination field, having a measurement signal input to which a sensor signal of the at least one measured parameter can be applied, wherein the open-loop and/or closed-loop controller is suitable and set up for carrying out a method of the invention.

It may be provided that the open-loop and/or closed-loop controller comprises at least two outputs at which control signals for controlling controllable switching elements of the illumination field can be tapped.

Furthermore, the invention relates to a circuit arrangement for the open-loop and/or closed-loop control of an illumination field. The circuit arrangement of the invention has an open-loop and/or closed-loop controller and an illumination field, wherein the illumination field comprises at least one first module and one second module, which each comprise at least one light source.

It may be provided that each module comprises at least one controllable switching element, wherein a control terminal of each controllable switching element is connected to an output of the open-loop and/or closed-loop controller.

It may be provided in this case that the open-loop and/or closed-loop controller controls one and/or more controllable switching elements of the modules to close or open.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
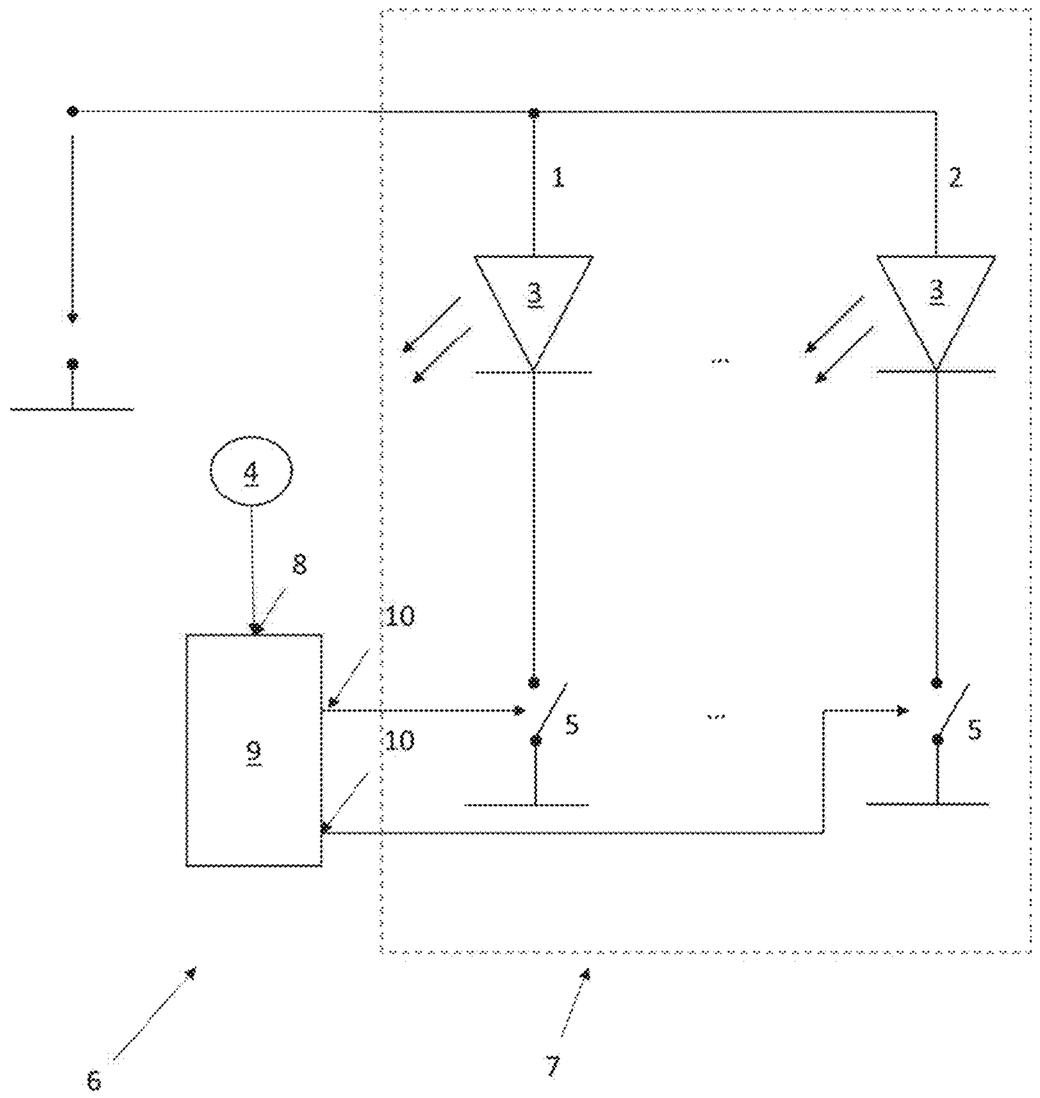
FIG. 1 is a block diagram of a circuit arrangement of an example of the invention.

An exemplary circuit arrangement 6 of the invention shown in FIG. 1 comprises an illumination field 7 with two modules 1, 2. Each module 1, 2 comprises a light source 3, in this case a light-emitting diode, and a controllable switching element 5. First module 1 and second module 2 will be referred to below according to the subscripts of the component designations. Modules 1 and 2 are connected in parallel. Light sources 3 are arranged within modules 1, 2 so that their anodes are in contact with a common node. FIG. 1 shows an exemplary structure of a circuit arrangement of the invention. It is also possible, without any inventive effort, for the modules to be electrically decoupled.

In addition to illumination field 7, circuit arrangement 6 of the invention comprises a measuring means for a parameter 4. The parameter measuring device is, for example, a speed measuring device or a distance measuring device. In addition, an open-loop and/or closed-loop controller 9 of the invention is provided in a circuit arrangement 6 of the invention. Open-loop and/or closed-loop controller 9 has at least one input 8 and a plurality of outputs 10. Open-loop and closed-loop controller 9 is connected to controllable switching elements 5 of illumination field 7 via these outputs 10. Control pulses can be sent to switching elements 5 via these outputs 10 in order to close or open them. The at least one input 8 is connected to the parameter measuring means for the measured parameter 4. A sensor signal of the at least one measured parameter 4 can be applied to this input 8. Open-loop and/or closed-loop controller 9 is set up so that illumination field 7 has a desired luminous intensity distribution. This is achieved in that controllable switching element 5 assigned to a light source 3 is controlled within a cycle period to close until a desired luminous intensity distribution is achieved. The switch-on times for closing controllable switching elements 5 and/or switch-off times for opening controllable switching elements 5 are determined based on a desired luminous intensity distribution of the individual modules 1, 2 or a desired overall luminous intensity distribution, wherein a transition between the desired luminous intensity distribution of the individual modules 1, 2 and the desired overall luminous intensity distribution is implemented continuously.

Figure 2:
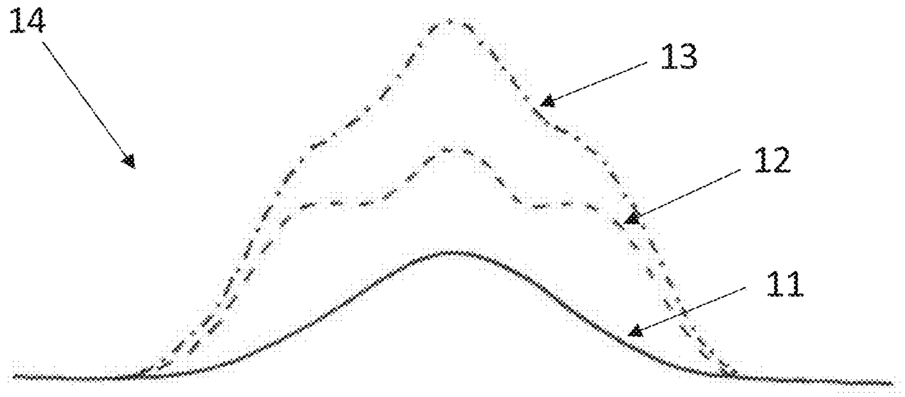
FIG. 2 shows luminous intensity distributions with an optimal luminous intensity distribution of at least one module.

Two exemplary luminous intensity distributions 11, 12 are shown in FIG. 2, which are generated by the individual modules 1, 2 in illumination field 7. Third luminous intensity distribution 13 is the overall luminous intensity distribution resulting from the superimposition of the two individual luminous intensity distributions 11, 12.

Luminous intensity distribution 12 of first module 1, in this case a matrix LED module, can be influenced only slightly by the low resolution of this module 1. Luminous intensity distribution 11 of second module 2, in this case a high-resolution HD module, is optimal in terms of homogeneity and intensity in FIG. 1. This is particularly relevant for illumination fields 7 in vehicles that can be viewed by an observer at close range.

Overall luminous intensity distribution 13, which results from the superimposition of the individual luminous intensity distributions 11, 12 of the individual modules 1, 2, also shows an inhomogeneous course due to the inhomogeneities of the luminous intensity distribution of first module 1.

Figure 3:
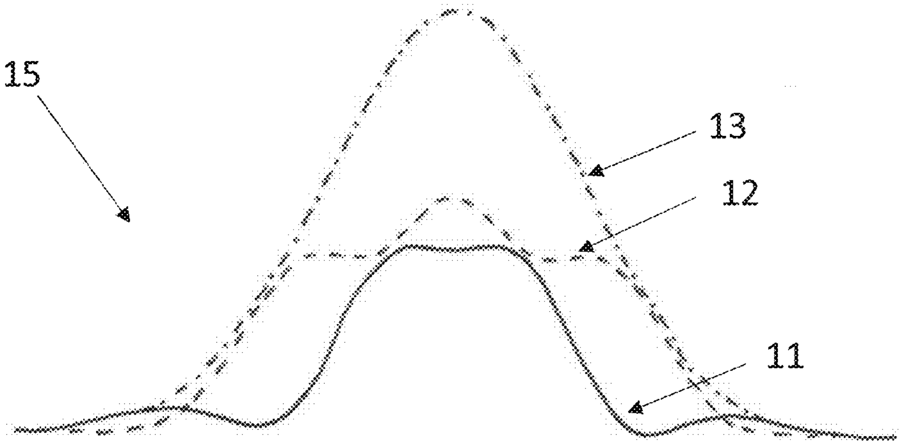
FIG. 3 shows luminous intensity distributions with an optimal overall luminous intensity distribution.

FIG. 3, in contrast, shows an optimal overall luminous intensity curve 13. Luminous intensity distribution 12 of first module 1 is identical to the curve in FIG. 1. Luminous intensity distribution 12 of second module 2 is calculated from the desired overall luminous intensity distribution 13 minus luminous intensity distribution 12 of first module 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A method for operating a circuit arrangement, the method comprising:

providing an illumination field that comprises at least one first module and one second module, which each comprise at least one light source;

providing an open-loop and/or closed-loop controller for the illumination field;

controlling each light source by the open-loop and/or closed-loop controller such that a brightness of each light source is set based on a desired luminous intensity distribution of the individual modules or a desired overall luminous intensity distribution; and implementing continuously a transition between the desired luminous intensity distribution of the individual modules and a desired overall luminous intensity distribution, wherein the transition between the desired luminous intensity distribution of the individual modules and the desired overall luminous intensity distribution takes place based on at least one measured parameter, and wherein the luminous intensity distributions are determined using the following formula, wherein the brightness for each light source is determined from the calculated luminous intensity distributions:

$$OverallLID_l = LID_{Module1,opt} + LID_{Module2,opt}$$

$$OverallLID_u = OverallLID_{opt} = LID_{Module1} + LID_{Module2}$$

$$OverallLID_m = (1 - v) * OverallLID_l + v * OverallLID_u$$

where $OverallLID_l$ is the luminous intensity distribution for parameter values below a lower threshold, $OverallLID_u$ is the luminous intensity distribution for parameter values above an upper threshold, $OverallLID_m$ is the luminous intensity distribution for parameter values above the lower threshold and below the upper threshold, $LID_{Module1,opt}$ is the desired luminous intensity distribution of the first module, $LID_{Module2,opt}$ is the desired luminous intensity distribution of the second module, $OverallLID_{opt}$ is the desired overall luminous intensity distribution, $LID_{Module1}$ is the luminous intensity distribution of the first module calculated to achieve the desired overall luminous intensity distribution, $LID_{Module2}$ is the luminous intensity distribution of the second module calculated to achieve the desired overall luminous intensity distribution, and where v is a distance between the lower threshold and the measured value as a percentage of the distance between the lower and upper thresholds.

2. The method according to claim 1, wherein each module comprises at least one controllable switching element, wherein the controllable switching elements are controlled by the open-loop and/or closed-loop controller such that the brightness of each light source is set by defining switch-on times and/or switch-off times for each light source by the open-loop and/or closed-loop controller, and wherein the open-loop and/or closed-loop controller controls at least one of the controllable switching elements of the modules during the switch-on times for closing and during the switch-off times for opening.

3. The method according to claim 1, wherein the desired overall luminous intensity distribution is created by superimposing the desired luminous intensity distributions of the individual modules.

4. The method according to claim 1, wherein the first module is an LED module with a low resolution and the second module is an LED module with a high resolution.

5. The method according to claim 1, wherein the at least one measured parameter includes a speed of the vehicle and/or a distance of the vehicle to other objects.

6. The method according to claim 5, wherein the lower and the upper threshold is stored in the open-loop and/or closed-loop controller.

7. The method according to claim 6, wherein when a measured value for the at least one measured parameter is below the lower threshold, the brightness for each light source is determined based on the desired luminous intensity distribution of the individual modules.

8. The method according to claim 6, wherein when a measured value for the at least one measured parameter is above the upper threshold, the brightness for each light source is determined based on the desired overall luminous intensity distribution.

9. The method according to claim 6, wherein when a measured value for the at least one measured parameter lies between the lower threshold and the upper threshold, the brightness for each light source is determined weighted based on a distance of the measured value to the respective threshold.

10. An open-loop and/or closed-loop controller for an illumination field, comprising:

a measurement signal input to which a sensor signal of at least one measured parameter is applied, wherein the open-loop and/or closed-loop controller is configured to perform the method according to claim 1.

11. The open-loop and/or closed-loop controller according to claim 10, wherein the open-loop and/or closed-loop controller comprises at least two outputs at which control signals for controlling controllable switching elements of the illumination field are adapted to be tapped.

12. A circuit arrangement for an open-loop and/or closed-loop control of an illumination field, comprising an open-loop and/or closed-loop controller according to claim 10; and an illumination field comprising at least one first module and one second module, which each comprise at least one light source.

13. The circuit arrangement according to claim 12, wherein each module comprises at least one controllable switching element, wherein a control terminal of each controllable switching element is connected to an output of the open-loop and/or closed-loop controller.

14. The circuit arrangement according to claim 12, wherein the open-loop and/or closed-loop controller controls an opening and a closing of at least one of the controllable switching elements of the modules.

* * * * *